Aug. 11, 1970  PIERRE-HENRI GALLAY  3,523,329
MACHINE FOR THE EXTRUSION, BLOWING, FILLING AND SEALING
OF THERMOPLASTIC MATERIAL BOTTLES
Filed Nov. 6, 1967  6 Sheets-Sheet 1

Inventor
Pierre-Henri Gallay
By
Cushman, Darby & Cushman
Attorneys

Inventor
Pierre-Henri Gallay
By
Cushman, Darby & Cushman
Attorneys

United States Patent Office 3,523,329
Patented Aug. 11, 1970

1

3,523,329
MACHINE FOR THE EXTRUSION, BLOWING, FILLING AND SEALING OF THERMOPLASTIC MATERIAL BOTTLES
Pierre-Henri Gallay, Hauts de Seine, France, assignor to Mecaplast S.A., Geneva, Switzerland, a Swiss body corporate
Filed Nov. 6, 1967, Ser. No. 680,637
Claims priority, application France, Nov. 10, 1966, 83,350
Int. Cl. B29c 5/10; B65b 3/02
U.S. Cl. 18—5        6 Claims

ABSTRACT OF THE DISCLOSURE

The specification discloses a machine for the extrusion, blowing, filling and sealing of thermoplastic material bottles, such machine comprising an extruder for extruding vertically a parison of thermoplastic material, a plurality of two part moulds, means for opening and closing said moulds, means for successively blowing bottles from said parison, filling the bottles and sealing the filled bottles while in the moulds and drive means to move the moulds continuously in a closed path without stopping and successively under the extruder and the blowing, filling and sealing means.

The packaging industry is using to an increasing extent bottles and flasks made of thermoplastic plastics material. The cost of these is a function of their weight and the cost of filling and storing. According to a procedure which has become fairly usual, the bottles are made on a blow-moulding machine at high rate, feeding a conventional filling chain. This filling chain, because of the mechanical operations which it comprises, demands of the bottles a resistance which is only obtained by increasing their weight, and this appreciably increases the cost of manufacture and thus reduces the economic interest. In addition, the pollution of the bottles because of handling operations frequently makes them unsuitable for certain contents, particularly for foodstuffs.

It is therefore desirable to have a single machine, which can successively effect the operations of extrusion, blowing, filling and sealing of the bottles. A certain number of machines have been proposed for this purpose, but the majority of them only provide relatively reduced operating rates which generally result in an intermittent working because of the stoppage times caused by the different operating phases.

According to the present invention there is provided a machine for the extrusion, blowing, filling and sealing of thermoplastic material bottles, such machine comprising an extruder for extruding vertically a parison of thermoplastic material, a plurality of two part moulds, means for opening and closing said moulds, means for successively blowing bottles from said parison, filling the bottles and sealing the filled bottles while in the moulds and drive means to move the moulds continuously in a closed path without stopping and successively under the extruder and the blowing, filling and sealing means.

The moulds can be mounted on horizontal and radial supports of a turntable having a vertical axis.

Advantageously the means for opening and closing said moulds each comprise a toggle member and a rod connecting each mould part to a support in a parallelogram linkage arrangement and actuating means connected to the two toggle members of each mould to operate the toggle members to open and close the mould.

The extruder will also advantageously be an oscillating extruder of the type described in copending patent application No. 657,809.

2

The blowing and filling means can be mounted on the actual support of each mould and can advantageously be of the type described in patent application No. 669,456.

In order that the invention may more readily be understood, the following description is given, merely by way of example, reference being made to the accompanying drawings, in which.

Figure 1:
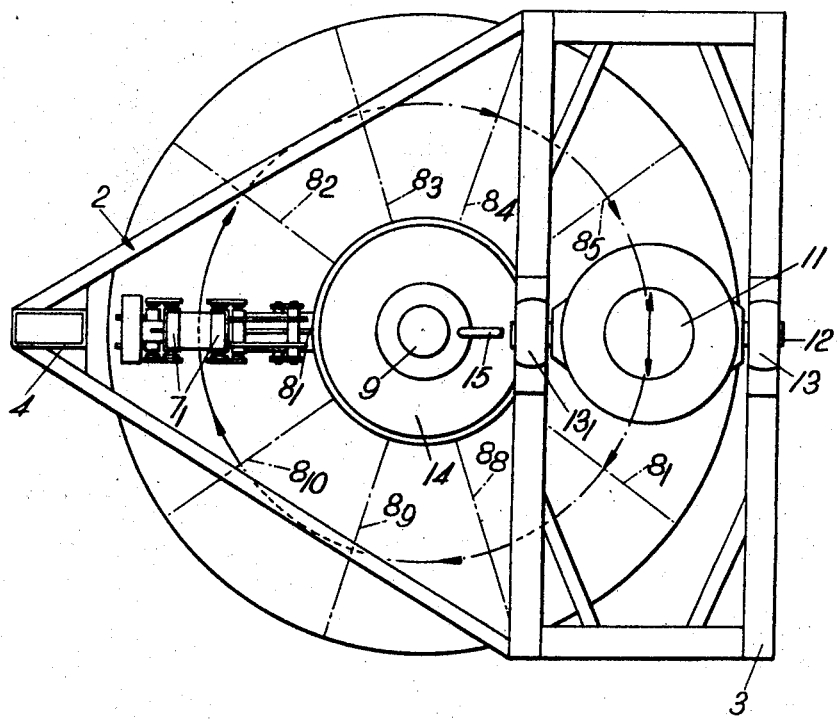
FIG. 1 is a plan view of one embodiment of machine with its control and synchronising members omitted for clarity.

In the machine illustrated in the drawings, all the members of the machine are carried by a frame formed partly by a base 1 and partly by a triangular frame 2, a rectangular frame 3 supported by legs 4, 5, 5' and 6. Ten two part moulds, $7_1$, $7_2$ . . . $7_{10}$, are each carried by one of ten equi-angularly spaced support arms $8_1$, $8_2$ . . . $8_{10}$, which form a driving turntable fixed to a vertical shaft 9, journalled in an upper support (not shown) carried by the frame 2, and in a lower support 10 carried by the base 1.

Each of the moulds comprises two parts, which are moveable away from and towards one another. Each mould part is mounted on a pair of rods 40 and a pair of toggle members 41, the rods and toggle members being pivoted to the associated support arm to form a parallelogram linkage arrangement. The toggle members 41 of the two parts of the mould are connected by arms 42 to a pneumatic jack 43. Operation of the jack will cause pivoting of the toggle members, to effect opening or closing of the mould.

A swinging vertical extruder 11, as described in copending application No. 657,809, is mounted for oscillatory movement above the path of the moulds 7, on a horizontal shaft 12, journalled in bearings 13, 13'.

Mounted at the top of the driving turntable of the mould, and on its shaft, is a tank 14 forming a reservoir which may be filled through a conduit 15. This tank 14 supplies, through conduits $44_1$, $44_2$ . . . $44_{10}$, one of the ten filling nozzles $16_1$, $16_2$ . . . $16_{10}$, the tank 14 being rotatable with a shaft 9, which extends through it.

Figure 6:
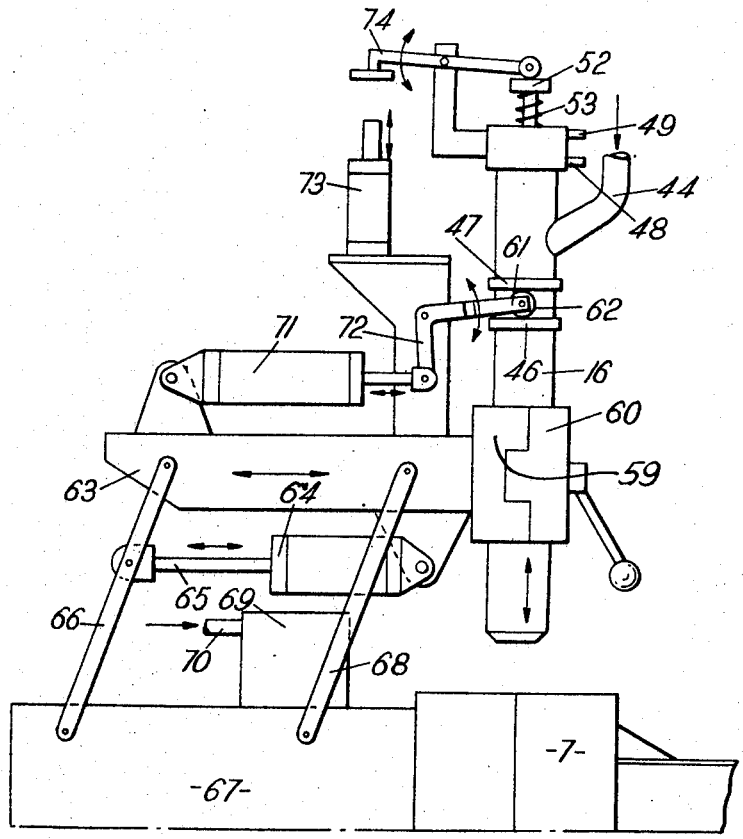
FIG. 6 is a fragmentary side elevation illustrating the mounting of the blowing and filling nozzle.
Figure 7:
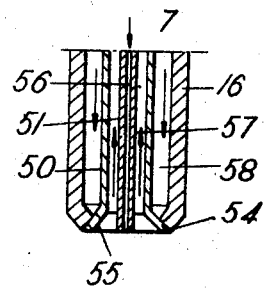
FIG. 7 is an axial section of the lower part of the nozzle shown in FIG. 6 and in the closed position.

The actual arrangement of mounting of the nozzle 16, and its construction are illustrated in FIGS. 6 and 7. The tubular body of the nozzle 16 carries two shoulders 46 and 47, and has at its upper end a filtered compressed air inlet pipe 48, a suction pipe 49, and the filling pipe 44. As can be seen in FIG. 7 the nozzle comprises two concentric tubes 50 and 51 the tube 50 being secured to a push rod 52 which is urged upwardly by a return spring 53. The tubular body has, at its lower end, a frusto-conical orifice 54 having the same conicity as a flared conical head 55, formed on the lower end of the tube 50. The three tubes 16, 50 and 51 define between then passages 56, 57 and 58 these passages being connected respectively to pipes 49, 48 and 44.

The body of the nozzle 16 slides freely in the fixing collar consisting of two parts 59, 60 provided with a sliding ring of self lubricating material, e.g. polytetrafluoroethylene. The position of the nozzle 16 is controlled by a fork 61 having rollers 62 positioned on either side of the body of the nozzle between the shoulders 46 and 47. The fixing collar 59, 60 is fixed to a support 63, which can oscillate from left to right under the action of a fluid pressure operated jack 64, fixed at one end to the support 63, and at the other end, by its rod 65 to an arm 66. The arm 66 is pivoted to the support 63 and to the support 67 of one of the mould parts 7 and forms a parallelogram linkage with a similar arm 68. The movement imparts to this parallelogram linkage by the action of the jack 64 thus permits the nozzle 16 to move from above the mould 7 rearwardly to a point above a cleaning cup 69 having an air conduit, 70.

Fixed to the support 63 is a fluid pressure operated jack 71, the rod of which is connected by a bell crank 72, to the fork 61 controlling the upward and downward movement of the nozzle. A further jack 73 operates, through a rocker 74, a push rod 52, which effects opening and closing of the end valve of the nozzle. In operation of the nozzle, the mould, having just received a parison from the extruder, is displaced on the driving turntable, and the nozzle 16 descends into this mould under the action of the jack 71 and air is blown in at 48 and inflates the parison. Then, in order to accelerate the cycle, the pressure is cut off and simultaneously broken in the mould by a suction produced by the conduit 49. The filling is then effected immediately by opening the valve of the nozzle under the action of the jack 73 and the push rod 52, a liquid arriving by way of the conduit 44. The valve 55 is then closed by the return of the jack 73 and the action of the spring 53 on the push rod 52, and the nozzle is raised by the jack 71. A slight suction then avoids the formation of drops while simultaneously a slight blowing effect maintained throughout the operation prevents upward movement of the liquid in the blowing conduit.

The jack 64 then rocks the entire assembly rearwardly to disengage the mould. The nozzle, forced downwardly again by the jack 71 can then be introduced into the cup 69 for drying with sterile air introduced through conduit 70.

Figure 8:
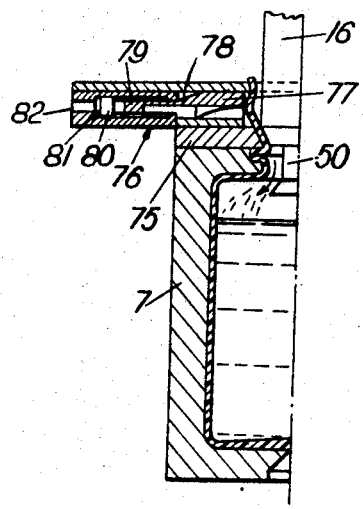
FIG. 8 is a partial sectional view of a moulded bottle and the nozzle during the filling phase.
Figure 9:
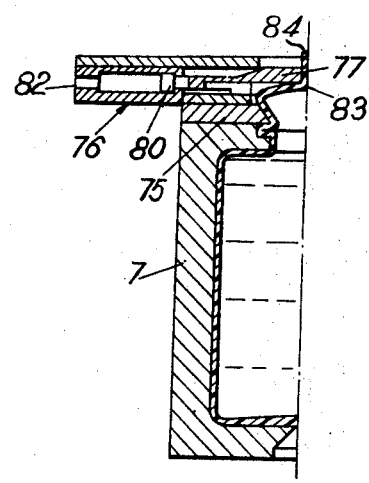
FIG. 9 is a view similar to FIG. 8 illustrating the welding of the neck of the bottle.

Referring more particularly to FIGS. 8 and 9, it will be seen that each mould half carries a mounting plate 75 on which is secured a welding assembly 76. Each welding assembly comprises a welding blade 77 connected by means of a guide rod 78 to the rod 79 of a piston 80 of a pneumatic jack 81, which is fed with compressed air through an orifice 82.

When the nozzle 16 has been engaged in the parison and the parison has been blown to form a bottle and filled with liquid as illustrated in FIG. 8, the nozzle is withdrawn, and the blades 77 moved towards one another under the action of the jacks 81, thus effecting a pressure weld at 83 by crushing the parison, a residual end 84 of which is severed either directly or at a further station. The blades 77 are then withdrawn and the filled and sealed body is ready to be removed from the mould.

Situated at the centre of the turntable, beneath the reservoir of tank 14 is a set of cams 18 formed by a succession of annular elements 19 which carry studs suitably placed for acting at the required moment on the valves 20 pneumatically controlling the jacks which ensure the operation of the members of the different arms of the turntable. Thus these valves control the operations of blowing, applying suction, filling and welding of the neck of the bottle as described above. A set of cams 18 is fixed, while the valves 20 carried by the turntable are moveable. A set of cams 18 is secured by means of the shaft 21, to the protective casing and drainage arrangement 22 which is itself fixed on the base 1. A fixed shaft 21 passes through the moveable vertical shaft 9 of the turntable which is hollow at its lower end.

Figure 2:
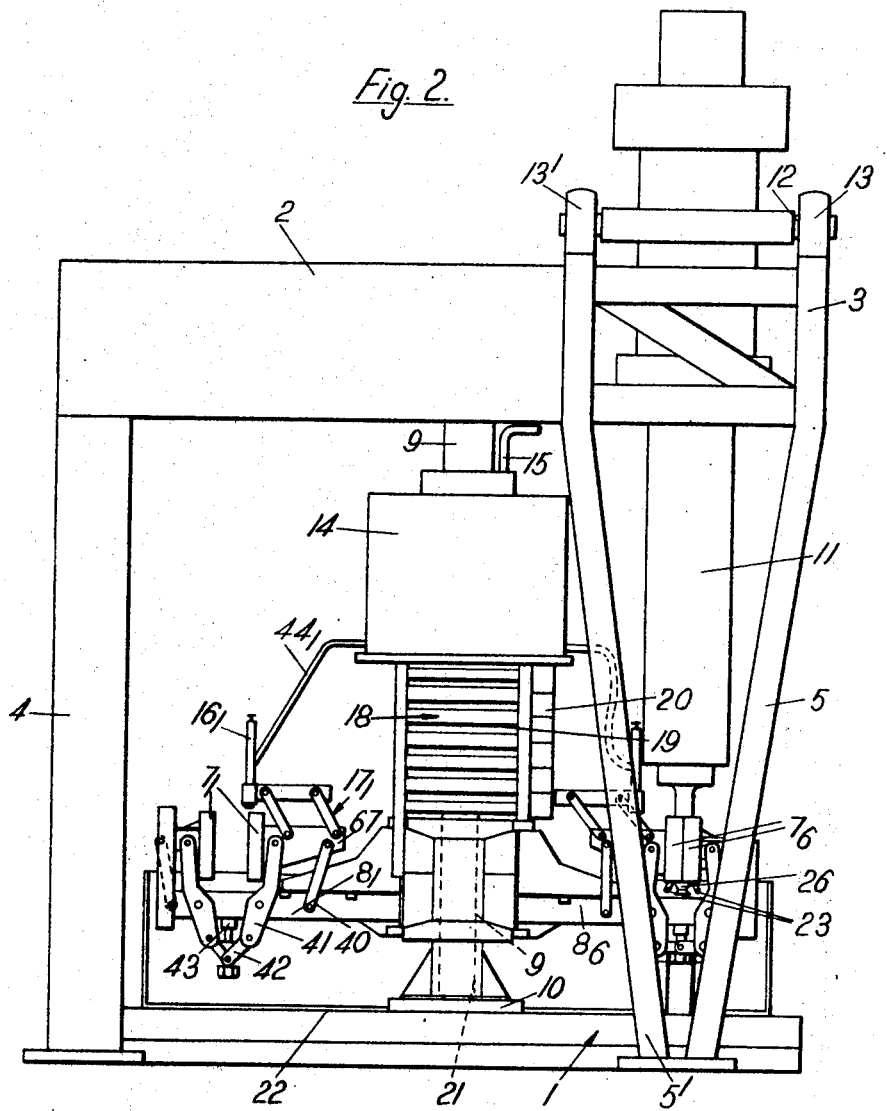
FIG. 2 is a side elevational view of the machine shown in FIG. 1, only two of the ten arms of the turntable and their associated members being shown.
Figure 3:
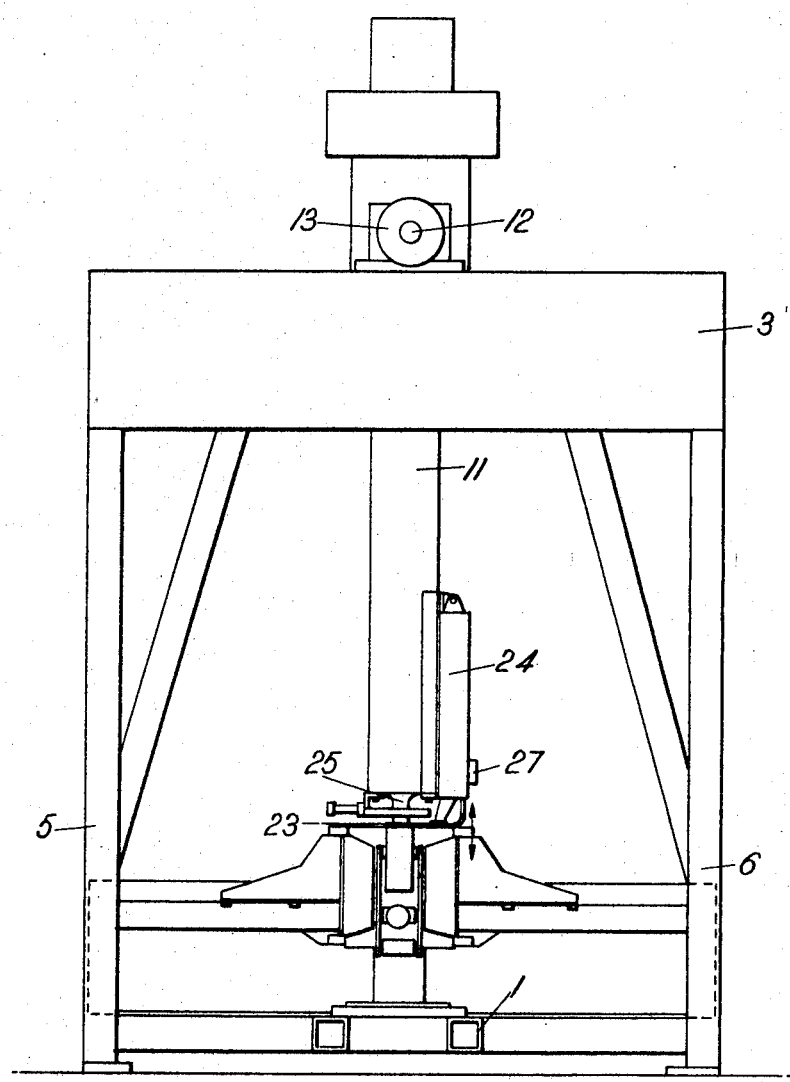
FIG. 3 is a rear elevational view of the same machine.

In order to close the lower end of the extruded tube and to draw it beneath the die, a gripper device 23 formed by two cranked rigid rods is provided beneath the extruder 11, and is controlled by jacks placed in a casing 24. In FIG. 3, the gripper device 23 is shown in an upper position immediately beneath the extrusion die 25, the two rods or arms of this gripper being placed on either side of the parison. The gripper 23 is so mounted that it is able to pass between the two parts of the open mould, the said parts only being able to be completely closed if the gripper 23 has passed entirely beyond the lower level of the mould 7. In FIG. 2, there can be seen beneath the closed mould 76 the two open arms of the gripper 23 and the gripped parison at 26. An electric or pneumatic relay 27 (FIG. 3) prevents the closing of the mould 7 in the event of the gripper 23 not having reached a level sufficient to be out of the path of the mould at the time the latter is closed.

Figure 4:
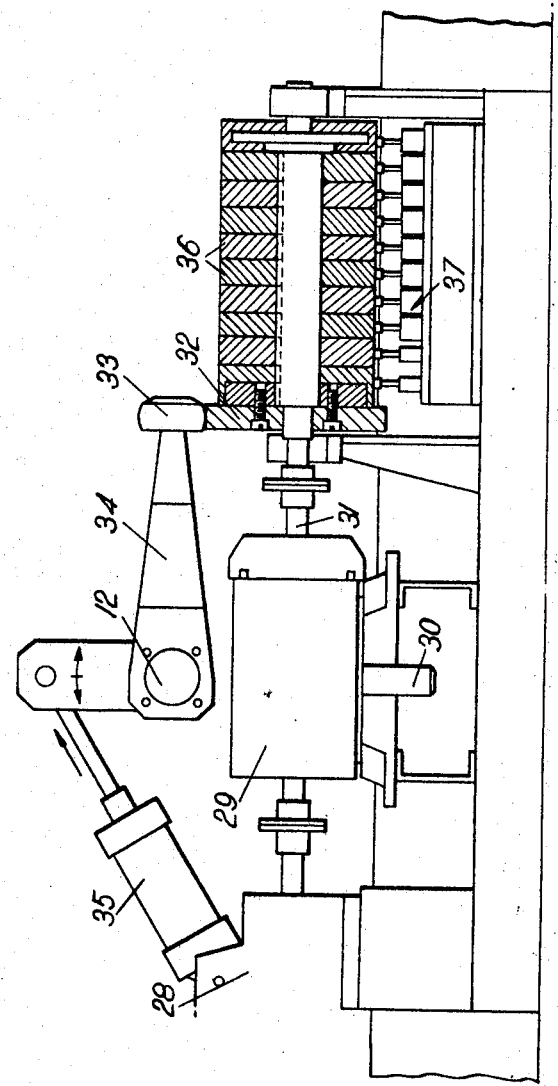
FIG. 4 is an elevation of the assembly of control and synchronising members.

The control of the turntable and of the oscillations of the extruder are produced by a single motor 28 (FIG. 4) driving a reduction gear 29, with two outputs 30, 31. Of these two outputs, the vertical output 30 drives the shaft 9 of the turntable while the other horizontal output 31 drives the cam 32 of suitably developed contour, for example heart-shaped, which acts on the roller 33 to give it an oscillating movement which is itself transmitted to the pivot shaft 12 of the extruder by the lever arm 34. A pneumatic jack 35 resiliently holds the roller 33 against the cam 32.

These two sets of control cams 18 and 20 (FIG. 2) and 36 and 37 (FIG. 4) for controlling the working cycle are driven, one by the turntable, the valves 20 turning about the block of cams 18 at the speed of rotation of the turntable, and the other by the shaft 31 controlling the oscillations of the extruder. The working cycle is such that, with each turn of the turntable, the extruder oscillates as many times as there are moulds. The ratio of the speed of rotation between the two cam blocks is thus from 1 to N, where N is equal to the number of moulds. In FIG. 1, a turntable having ten positions is shown so that the ratio of the speeds between the two cam blocks is thus 10 in this case. Thus, for example, for a turntable for ten moulds turning at the rate of one revolution in 15 seconds, the respective speeds of the cam blocks will be from 4 r.p.m. for the device 18, 20 and 40 r.p.m. for the device 36, 37. It is thus seen that all the high-speed operations are controlled by the cams 36, for which 5° of angle give an accuracy of substantially $2/100$ of a second, as against $2/10$ of a second on the cams 18.

This arrangement, which places the entire machine assembly fully under the control of a single driving member, gives a high safeguard in the operation and association of the various operations.

Figure 5:
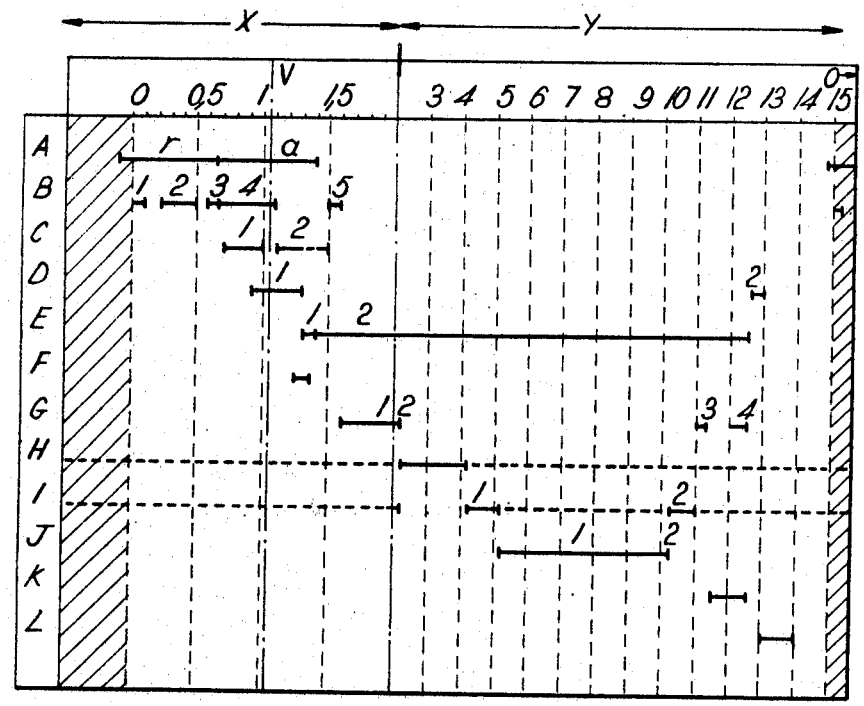
FIG. 5 is a diagram of the operating cycle.

The functioning of the machine which has just been described is indicated diagrammatically in FIG. 5, in which the scale of the time base is in $1/10$ second over portion X and in seconds over portion Y.

The extruder 11 oscillates 40 times per minute (Phase A), a mould 7 being positioned beneath this extruder every 1½ seconds.

During the rearward travel of the extruder (A–r), the drawing gripper 23 of the parison is opened (Phase B–1) moves upwardly (B–2) and is then closed (B–3) on the extruded tube portion. During the advancing travel of the extruder (Phase A–a), the gripper 23 is lowered at a regularly increasing speed, for example, and draws the parison (B–4) at the same time as the latter undergoes a first blowing (Phase C–1) while the mould 7 begins to close. This first blowing, suitably measured and programmed, produced by blowing through a passage in the die, holds the tube in shape during its drawing and participates in the equalising of the thicknesses of the walls of the parison. With the extruder continuing its oscillatory travel towards the front, and passing through the vertical, the mould completes its closing movement (D–1) and the parison undergoes a second blowing intended for the formation of a flange or swelling, which is nipped at the top of the mould (Phase E–1) and the parison is cut off (Phase F). The drawing gripper is opened (B–5)

and a new mould comes beneath the extruder, when the preceding operations are repeated.

The closed mould, containing the extruded parison, continues its rotational movement, driven by the turntable, the neck, being held by the grippers (E–2).

The blowing and filling nozzle 16 advances and then descends in order to be positioned on the mould and the blowing proper of the parison is carried out for about 2 seconds through passage 56 (Phase H). After about 1 second of decompression by sucking through passage 57 (Phase I–1), the filling nozzle 55 is opened (Phase J–1) and the blown bottle is filled.

The filling nozzle is closed (J–2), the foam is drawn off by sucking through passage 57 (I–2), the nozzle is raised (G–3) and then moved back (G–4), while welding of the neck (Phase K) is carried out by applying air under pressure to orifice 82. The blades 77 then free the neck, the mould is opened (D–2) and the bottle is extracted (Phase L). As shown by the dotted lines in FIG. 5 a slight suction effect is maintained in the passage 57 to remove drops on the end of the nozzle. A slight blowing is also maintained in passage 56 and prevents the upward movement of liquid in the passage and the stray drops which would result therefrom during blowing.

The oscillation of the extruder 11, combined with the displacement of the moulds 7, permits the continuous operation of this extruder, the reduced size of the elements arranged above the mould providing for the parison the possibility of flowing without striking against any of these elements.

The technique of extrusion, blowing and filling and sealing in the mould which has just been described ensures absolute regularity of the filled volumes, as well as a remarkable asepsis. Bottles of pasteurised milk (1 litre) filled by this method could for example be kept at normal temperature for more than two months without any appearance of microorganisms, and of course without the milk turning when it is heated for consumption.

If desired, the supply tank of the filling nozzles could be cylindrical and integral with the driving shaft of the turntable instead of having the said shaft extending therethrough. Furthermore, the jack 35 for the urging roller 34 controlling the oscillations of the extruder against cam 33 could be replaced by an ordinary spring.

I claim:

1. A machine for the extrusion, blowing, filling and sealing of thermoplastic material bottles comprising, in combination:
   (a) a pendular oscillating extruder effective to extrude vertically a parison of thermoplastic material;
   (b) a plurality of two-part moulds;
   (c) means for opening and closing said moulds;
   (d) means for successively blowing bottles from said parison, filling said bottles and sealing the filled bottles while in said moulds;
   (e) drive means effective to move said moulds continuously in a closed path without stopping and successively under said extruder and said blowing, filling and sealing means;
   (f) a first control arrangement including a first set of cams and co-operating cam followers effective to operate the means for opening and closing the moulds and to operate the blowing, filling and sealing means;
   (g) a second control arrangement including a second set of cams and co-operating cam followers effective to operate the extruder;
   (h) a single motor connected to operate said drive means;
   (i) a reduction gear driven by said single motor; and
   (j) two output shafts to said reduction gear driven at different speeds, one output shaft being connected to said first set of cams the other output shaft being connected to the second set of followers to rotate said second set of followers relative to said second set of cams, whereby the duration of the operations controlled by said first control arrangement is a multiple of the duration of the operations controlled by the second control arrangement, the given factor of multiplication being the number of moulds on the machine.

2. The machine defined in claim 1, wherein the extruder is generally vertical and is mounted for oscillation about a horizontal axis to follow a portion of the path of movement of each mould.

3. The machine defined in claim 1, wherein each said mould is mounted on a support and wherein each mould has associated therewith a blowing, filling and sealing means mounted for axial movement and movement perpendicular to the axis of the associated mould.

4. The machine defined in claim 1 and further comprising a vertical shaft, a turntable mounted for rotation about said vertical shaft said turntable carrying said moulds, and wherein said other set of cam followers is mounted on said vertical shaft.

5. A machine for extrusion, blowing, filling and sealing of thermoplastic material bottles, comprising, in combination:
   (a) a pendular oscillating extruder effective to extrude vertically a parison of thermoplastic material;
   (b) a plurality of two-parts moulds having a lower level thereto;
   (c) means for opening and closing said moulds;
   (d) means for successively blowing bottles from said parison, filling said bottles and sealing the filled bottles while in said moulds;
   (e) drive means located to move said moulds continuously in a close path without stopping and successively under said extruder, and said blowing, filling and sealing means;
   (f) an extrusion die on said extruder;
   (g) a gripper located below said extruder, effective to grip a parison extruded thereby; and
   (h) means for moving said gripper downwardly beyond the lower level of said moulds effective to stretch the parison.

6. The machine defined in claim 5, wherein said gripper comprises two rigid rods mounted for pivoting about axes parallel to the axis of the extruder.

References Cited

UNITED STATES PATENTS

| | | | |
|---|---|---|---|
| 3,079,631 | 3/1963 | Gasmire | 18—5 XR |
| 3,327,352 | 6/1967 | Osgood | 18—20 |
| 3,357,046 | 12/1967 | Pechthold | 53—140 XR |
| 3,344,471 | 10/1967 | Martelli | 18—5 |

H. A. KILBY, Jr., Primary Examiner

U.S. Cl. X.R.

53—140